United States Patent
Mobin et al.

(10) Patent No.: US 9,749,162 B1
(45) Date of Patent: Aug. 29, 2017

(54) RECEIVER BANDWIDTH ADAPTATION

(71) Applicant: Avago Technologies General IP (Singapore) Pte. Ltd., Singapore (SG)

(72) Inventors: Mohammad Mobin, Allentown, PA (US); Haitao Xia, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/084,026

(22) Filed: Mar. 29, 2016

(51) Int. Cl.
 *H03H 7/40* (2006.01)
 *H04L 25/03* (2006.01)

(52) U.S. Cl.
 CPC .. *H04L 25/03885* (2013.01); *H04L 25/03057* (2013.01); *H04L 2025/03707* (2013.01)

(58) Field of Classification Search
 CPC ......... H04L 25/03885; H04L 25/03057; H04L 2025/03707
 See application file for complete search history.

(56) References Cited

U.S. PATENT DOCUMENTS

| | | | |
|---|---|---|---|
| 7,916,780 B2 | 3/2011 | Lee | |
| 8,243,782 B2* | 8/2012 | Mobin | H04L 25/03057 375/232 |
| 2006/0045176 A1* | 3/2006 | Moughabghab | H04L 25/03885 375/232 |
| 2008/0304559 A1* | 12/2008 | Wu | H04L 25/03057 375/233 |
| 2010/0086017 A1 | 4/2010 | Shumarayev et al. | |
| 2014/0169439 A1* | 6/2014 | Liu | H04L 25/03885 375/233 |
| 2015/0207480 A1 | 7/2015 | Hoang et al. | |

OTHER PUBLICATIONS

Kim, "An Adaptive Equalizer for High-Speed Receiver using a CDR-Assisted All-Digital Jitter Measurement", JSTS vol. 15, No. 2, Apr. 2015.

* cited by examiner

*Primary Examiner* — Dac Ha
(74) *Attorney, Agent, or Firm* — Sheridan Ross P.C.

(57) ABSTRACT

An apparatus for processing data includes a linear equalizer, a load switchably connected to an output of the linear equalizer, a slicer configured to sample a signal derived from the output of the linear equalizer, and a detector circuit configured to detect an over-equalization condition in data to be sampled by the slicer and to connect the load to the output of the linear equalizer in the over-equalization condition.

20 Claims, 4 Drawing Sheets

RECEIVER BANDWIDTH ADAPTATION

FIELD OF THE INVENTION

Various embodiments of the present invention provide for bandwidth adaptation in a serializer/deserializer (SerDes) receiver based on inner and outer eye levels.

BACKGROUND

Serializer and Deserializer (SerDes) circuits facilitate the transmission of data across a serial link, particularly in high speed digital communication systems. Data to be transmitted from a first location is serialized or converted from parallel data to serial data and is transmitted across a communications channel to a receiver at a second location. To recover the transmitted information, the receiver samples an analog waveform and must then reliably detect values of the sampled data in the process of converting back from serial data to parallel data. The analog waveform can be equalized in the transmitter or receiver or both to reduce frequency dependent loss in the transmission channel. However, over-equalization of the waveform, either in the transmitter or receiver or both, can make it more difficult to detect the correct values of the sampled data.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Embodiments of the present invention are related to adapting the bandwidth of a serializer/deserializer receiver based on inner and outer eye adaptation levels. The receiver, especially when used with a short channel, can be over-equalized by the driving transmitter of a link partner device or even in the receiver itself. Equalization can be applied to compensate for frequency dependent loss in the channel or elsewhere in the system. High frequency data, such as a run of alternating values (e.g., '101') which forms the inner data eye in an eye diagram, typically suffers more loss in the channel than low frequency data, such as a data pattern with runs of same values (e.g., '110') which forms the outer data eye in an eye diagram. To prevent or correct the different amount of loss affecting different data patterns, data can be equalized in either or both the transmitter and receiver. Such equalization can be applied in any suitable manner, such as using a continuous time linear equalization filter or a digital finite impulse response filter, based on any suitable control or feedback mechanism.

Figure 1A:
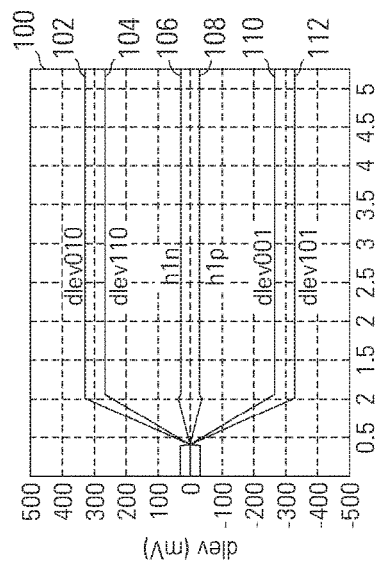
FIG. 1A depicts the data levels dlev010, dlev110, dlev001, dlev101 in a serializer/deserializer decision feedback equalizer for three-bit data patterns that are over-equalized in accordance with some embodiments of the present invention.

However, if the signal is over-equalized, for example if the channel is believed to be more lossy than it actually is, the relative amplitude of high frequency data patterns in the over-equalized signal will be greater than they should be. An example of this over-equalization can be seen in FIG. 1A and FIG. 1B. Turning to FIG. 1A, a plot 100 depicts the decision threshold levels or data levels as a function of sample index in a serializer/deserializer decision feedback equalizer. The data level for a three-bit pattern is referred to herein as dlevxyz, where x is the previous decision, y is the current decision, and z is the next decision. For example, dlev010 refers to the data levels for a signal transition from 0 to 1 to 0. The first data level dlev010 102 shows the approximate magnitude of an example over-equalized signal at the center bit of the three bit pattern '010'. The second data level dlev110 104 shows the approximate magnitude of an example over-equalized signal at the center bit of the three bit pattern '110'. The third data level dlev001 110 shows the approximate magnitude of an example over-equalized signal at the center bit of the three bit pattern '001'. The fourth data level dlev101 112 shows the approximate magnitude of an example over-equalized signal at the center bit of the three bit pattern '101'. The positions or voltage levels h1n 106 and h1p 108 for data latches are also shown, where data latch thresholds can be set to capture the value of the data bit corresponding to the eye.

Figure 1B:
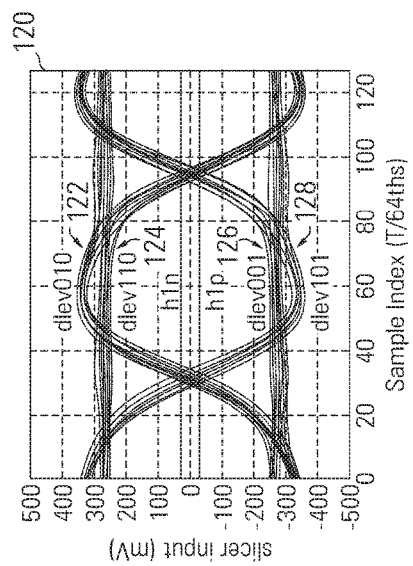
FIG. 1B depicts the data eye in an eye diagram for over-equalized data in accordance with some embodiments of the present invention.

Turning to FIG. 1B, an eye diagram 120 for the same example over-equalized signal of FIG. 1A is depicted. The eye diagram depicts the continuous time data signal, superimposed for various three-bit patterns, which visually depicts the effect of over-equalization. Notably, the inner eye levels at points 122, 128 corresponding to high frequency data patterns '010' and '101', respectively, have greater magnitudes than the outer eye levels at points 124, 126 corresponding to lower frequency data patterns '110' and '001', respectively, due to the over-equalization, resulting in the decision thresholds dlev010 102, dlev110 104, dlev001 110 and dlev101 112 shown in FIG. 1A. The positions or voltage levels h1n 206 and h1p 208 for data latches are also shown, where data latch thresholds can be set to capture the value of the data bit corresponding to the eye.

Over-equalization is defined herein as the data equalization level that causes the inner eye of the eye diagram to have a greater magnitude than the outer eye. As a result of over-equalization, clock and data recovery (CDR) generated jitter is aggravated, causing loss of jitter tolerance. Short data channels can be particularly susceptible to over-equalization. In serializer/deserializer applications focus is most often placed on long channel equalization. However, very often short channels pose challenges when an excessive equalization is applied either by the transmitter (which may be beyond local serializer/deserializer control) or by the receiver due to excessive process, voltage and temperature (PVT) spread in the boost characteristics of the linear equalizer in the serializer/deserializer receiver. To guard against short channel over-equalization the serializer/deserializer is configured to detect the presence of the over-equalization state and to correct it by reducing the receiver bandwidth.

The receiver disclosed herein applies an adaptation scheme to track the inner and outer eye of a received signal. If the magnitude of the inner eye is greater than the outer eye then an over-equalization state is detected. For example, in FIG. 1B, the magnitude of the inner eye dlev010 (point 122) at about 330 mV is greater than the magnitude of the outer eye dlev110 (point 124) at about 280 mV. Similarly, the magnitude of the inner eye dlev101 (point 128) at about −330 mV is greater than the magnitude of the outer eye dlev001 (point 126) at about −280 mV. In this example, the data comprises non return to zero (NRZ) data having valid states at roughly symmetrical levels above and below 0 V, and the magnitudes of the inner eye and of the outer eye are compared using absolute values. However, the bandwidth adaptation disclosed herein is not limited to use with NRZ data, and the metrics and comparison methods used to evaluate the relative values of the inner and outer eye to detect over-equalization can be adapted to other data protocols. Based upon the disclosure herein, one of skill of the art will recognize a number of data protocols that can be equivalently used with the receiver bandwidth adaptation based on inner and outer eye levels disclosed herein in accordance with various embodiments of the invention.

The receiver bandwidth adaptation can be applied in any suitable manner to compensate for over-equalization. In some embodiments including a continuous time linear equalizer in a serializer/deserializer receiver, the continuous time linear equalizer output is loaded when the over-equalization state is detected, to cut the Nyquist boost and hence counter the over-equalization condition, before data is sampled by latches in a decision device or slicer in the receiver. The loading can be done, for example, by applying a complex load comprising a capacitor and resistor network, or a capacitive load.

Figure 2A:
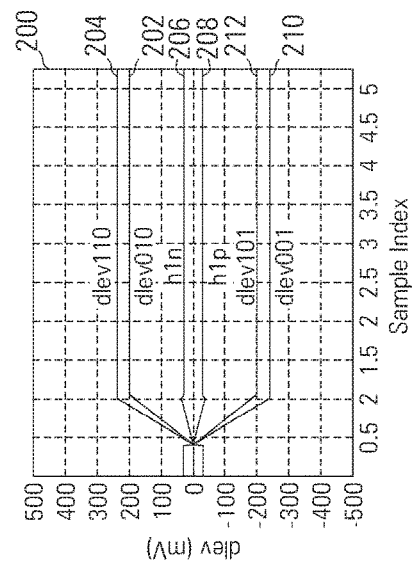
FIG. 2A depicts the data levels dlev010, dlev110, dlev001, dlev101 in a serializer/deserializer decision feedback equalizer for three-bit data patterns that are not over-equalized in accordance with some embodiments of the present invention.

Turning to FIG. 2A, a plot 200 depicts the decision threshold levels or data levels as a function of sample index in a serializer/deserializer decision feedback equalizer for data that has not been over-equalized, which can be interpreted in some cases as properly equalized. The first decision threshold dlev010 202 shows the approximate magnitude of the center bit of the three bit pattern '010'. The second decision threshold dlev110 204 shows the approximate magnitude of the center bit of the three bit pattern '110'. The third decision threshold dlev001 210 shows the approximate magnitude of the center bit of the three bit pattern '001'. The fourth decision threshold dlev101 212 shows the approximate magnitude of an example over-equalized signal at the center bit of the three bit pattern '101'.

Figure 2B:
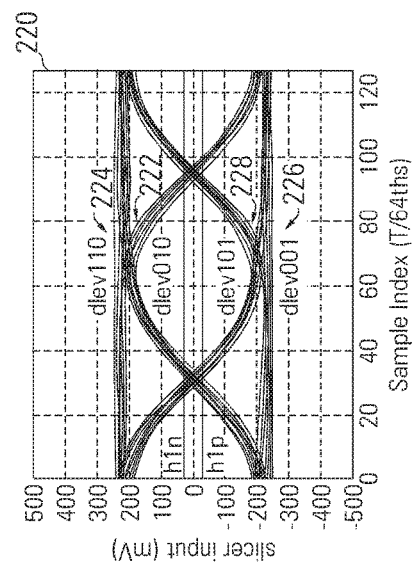
FIG. 2B depicts the data eye in an eye diagram for data that is not over-equalized in accordance with some embodiments of the present invention.

Turning to FIG. 2B, an eye diagram 220 for the same properly equalized example signal of FIG. 2A is depicted. Notably, the outer eye levels at points 224, 226 corresponding to lower frequency data patterns '110' and '001', respectively, have greater magnitudes than the inner eye levels at points 222, 228 corresponding to high frequency data patterns '010' and '101', respectively, resulting in the decision thresholds dlev010 202, dlev110 204, dlev001 210 and dlev101 212 shown in FIG. 2A.

In some embodiments, the serializer/deserializer receiver includes a continuous time linear equalizer to filter the analog signal before it is sampled. In some of these embodiments in which the boost applied by the linear equalizer is continuously or periodically adapted, the boost index in the linear equalizer is monitored so that the load is not applied until the linear equalizer boost index has converged to its minimum value. In this manner, the receiver bandwidth is not adapted based on the eye levels until the linear equalizer has first done all it can to reduce boost. In other words, in the latter embodiment, the linear equalizer is adapted as much as possible before the receiver bandwidth is reduced to compensate for over-equalization.

Figure 3:
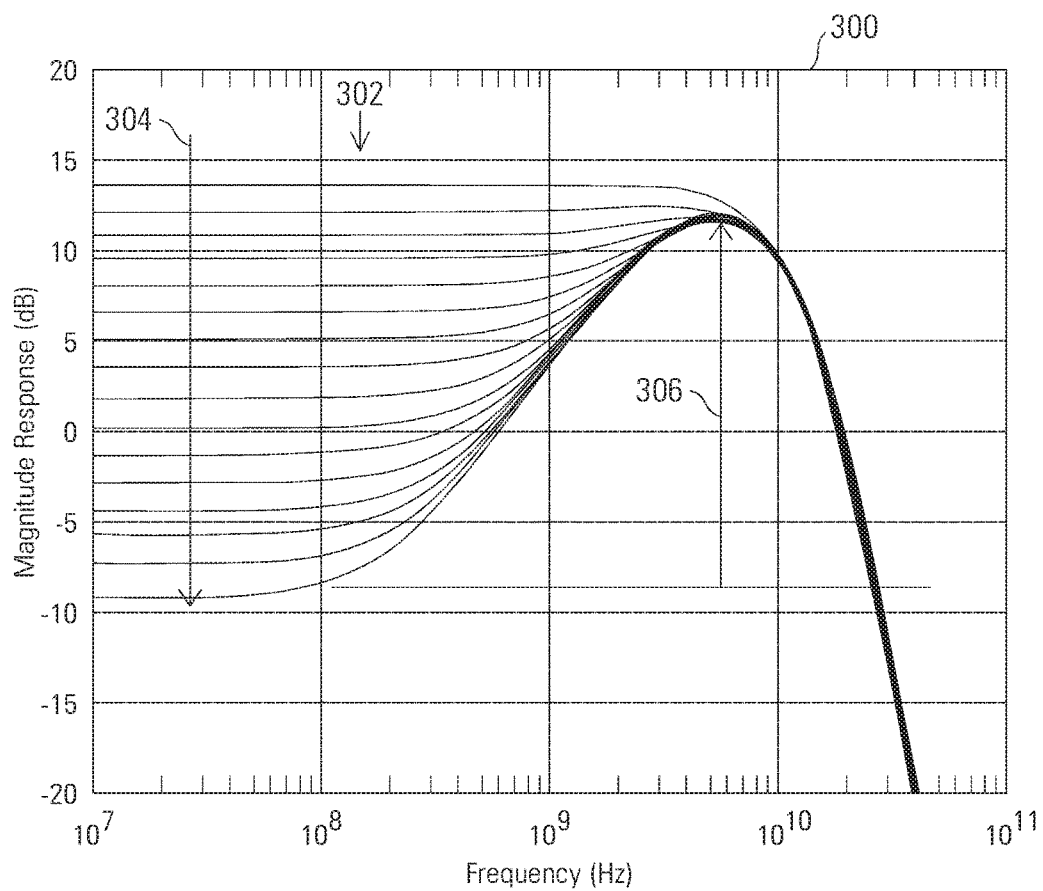
FIG. 3 depicts a set of magnitude response curves for a coupled linear equalizer with sweeping Gi gain index values and fixed Ki boost index values, illustrating the relationship between gain and boost wherein the relative high frequency boost increases as DC gain decreases in accordance with some embodiments of the present invention.
Figure 4:
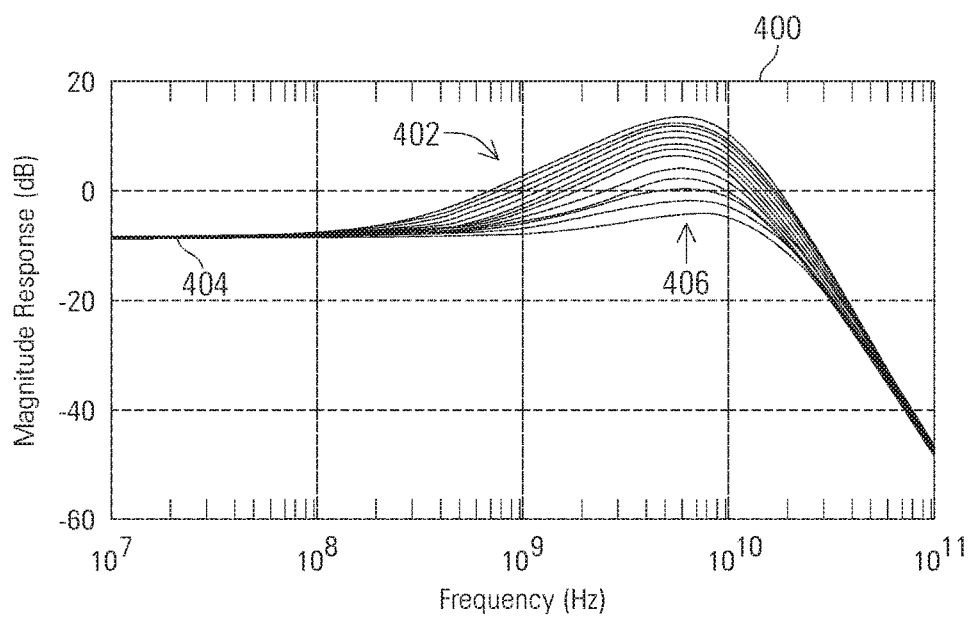
FIG. 4 depicts a set of magnitude response curves for a coupled linear equalizer with sweeping Ki boost index values and fixed Gi gain index values in accordance with some embodiments of the present invention.

Turning to FIG. 3, a set of magnitude response curves 302 are depicted for a coupled continuous time linear equalizer and variable gain amplifier with sweeping Gi gain index values and fixed Ki boost index values, illustrating the relationship between gain and boost wherein the relative high frequency boost increases as DC gain decreases in accordance with some embodiments of the present invention. The boost effectively amplifies the high frequency signal without amplifying the low frequency signal. A coupled linear equalizer/variable gain amplifier tap adaptation circuit adapts coefficients that control the gain applied by the variable gain amplifier and the boost applied by the coupled linear equalizer. In a coupled linear equalizer, as the low frequency gain 304 is decreased, the relative high frequency boost 306 increases and vice versa. This characteristic is also illustrated by the set of magnitude response curves 402 in the plot 400 of FIG. 4, in which the gain 404 of the variable gain amplifier is fixed while the boost 406 of the coupled linear equalizer is swept through different values. It is evident that as the variable gain amplification is increased, the effective equalization capability of the coupled linear equalizer is decreased.

In some embodiments which include a continuous time linear equalizer, a tap adaptation circuit will apply an algorithm to adjust the tap coefficients (and thereby the boost) for the linear equalizer. In some cases, the continuous time linear equalizer is coupled with a variable gain amplifier, and the tap adaptation circuit jointly adapts the tap coefficients (and thereby the boost) for the linear equalizer and the gain of the variable gain amplifier, for example applying a weighted least mean square (LMS) gradient and a group delay (GD) gradient to achieve desired gain and boost settings for a target channel. The group delay gradient optimizes the horizontal opening (or zero crossing spread distribution) of the data eye in an eye diagram by minimizing the zero crossing spread distribution. In some embodiments, the group delay gradient is calculated using the following generic equation:

$$gdGrad(n) = 1 \text{ if} \left\{ \prod_{i=1}^{M} d(n-i) = x \right\} * \quad \text{(Eq 1)}$$

$$\left\{ \prod_{i=1}^{1} T(n-i) = x \right\} * \left\{ \prod_{i=-N}^{0} d(n-i) = y \right\}$$

Else $$gdGrad(n) = -1 \text{ if} \left\{ \prod_{i=1}^{M} d(n-i) = x \right\} *$$

$$\left\{ \prod_{i=1}^{1} T(n-i) = y \right\} * \left\{ \prod_{i=-N}^{0} d(n-i) = y \right\}$$

Else $$gdGrad(n) = 0$$

where y=not(x), d(n) is the data sample and T(n) is the transition sample, M is programmed with integer values from 2 to 5, and N=0. Based upon the disclosure herein, one of skill of the art will recognize a number of suitable circuits that may be used to calculate the group delay gradient in accordance with various embodiments of the invention, such as a number of sampling latches placed at various sampling locations.

The least mean square gradient optimizes the vertical opening of the eye by minimizing the signal spread distribution at the target error latch position set by a multiplexer EMUX in the decision feedback equalizer using a sign-sign least mean square algorithm. In some embodiments, the least mean square gradient is calculated according to the following equation:

$$lmsGrad = e(n) * \sum_{i=2}^{N} b(i) * d(n-i) \qquad (Eq\ 2)$$

where e(n) is an error signal, where N is programmed with integer values from 2 to 5 and where b(2), b(3), b(4) and b(5) are 0 or 1.

In embodiments in which the boost is controlled in the linear equalizer by a tap adaptation circuit, the tap adaptation circuit will tend to reduce the boost index Ki of the linear equalizer in the presence of an over-equalized signal. The receiver bandwidth adaptation disclosed herein can include the value of the boost index Ki being applied in the equalizer in a test that determines whether to reduce the receiver bandwidth. If the boost index Ki being applied in the equalizer is greater than zero, meaning that the linear equalizer boost can still be reduced by the tap adaptation circuit, the receiver bandwidth is not reduced. If the boost index Ki being applied in the linear equalizer is at zero or at any other minimum boost value for the linear equalizer, and the signal is still over-equalized based on the eye adaptation levels, then the receiver bandwidth is reduced, for example by applying a complex or capacitive load to the output of the linear equalizer. Notably, even when the boost index in the linear equalizer is at its minimum value, some residual boost can still amplify the inner eye, particularly with a short channel. In other words, over-equalization cannot be fully corrected in some cases by adapting the boost in the linear equalizer. In some embodiments, the receiver bandwidth is adjusted to correct for over-equalization by applying an additional load to the equalizer output or at any other suitable point in the serializer/deserializer receiver, not by adjusting the existing load on the signal inherent in other processing circuits of the receiver. In some other embodiments, the receiver bandwidth is adapted by controlling low pass filtering in the continuous time linear equalizer.

Because the receiver bandwidth adaptation for over-equalized signal control is not performed in the continuous time linear equalizer in some cases, the continuous time linear equalizer is more robust and is allowed to perform its intended operation to apply high pass filtering to incoming signals. The receiver bandwidth adaptation is activated when the continuous time linear equalizer boost index has reached its lowest boost setting and the signal is still over-equalized.

Figure 5:
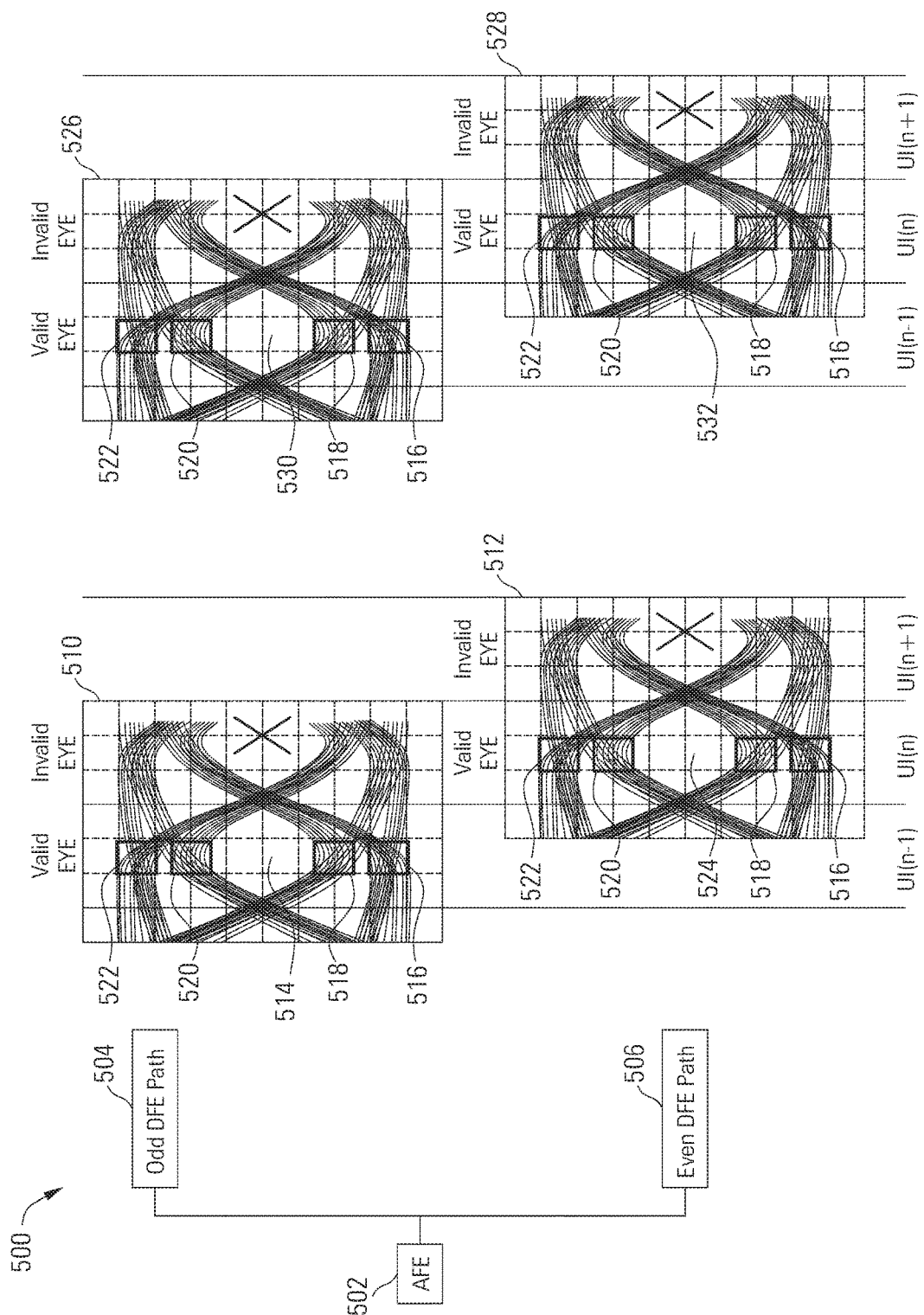
FIG. 5 depicts latch settings in odd and even signal paths in a decision feedback equalizer in accordance with some embodiments of the present invention.

Turning to FIG. 5, latch settings are depicted with respect to eye diagrams for odd and even signal paths in a decision feedback equalizer in accordance with some embodiments of the present invention. Generally, serial data is processed in an analog front end 502, such as, but not limited to, a variable gain amplifier and coupled linear equalizer, and is then sampled or sliced and can be processed in an odd path 504 and an even path 506 of a decision feedback equalizer. In a very high speed serializer/deserializer, it may not be possible to apply the desired signal processing on the fly without splitting the stream into two or more paths. By splitting the stream into at least two paths, each alternate data eye can be processed in a different path. For example, a first interval UL(n−1) can be processed in the odd data path 504, the next interval UL(n) can be processed in the even data path 506, and the next interval UL(n+1) can be processed in the odd data path 504, etc.

The data levels dlev010 102, dlev110 104, dlev001 110, dlev101 112 are determined in the decision feedback equalizer and are used by the tap adaptation circuit, for example to adapt coefficients that control the gain applied by the variable gain amplifier and the boost applied by the coupled linear equalizer. The data levels dlev010 102, dlev110 104, dlev001 110, dlev101 112 are also used to identify when the signal is over-equalized.

The adaptation information is gathered from error latches placed at different dlevxyz voltage locations. In some embodiments of a decision feedback equalizer summer path there are four possible voltage levels or locations for the placement of the error latches, position 0 516, position 1 520, position 2 518 and position 3 522. In some cases, only one physical error latch is used to gather the error statistics required for adaptation. As a result the error latch voltage position is multiplexed from one voltage level to another using analog voltage multiplexing in the decision feedback equalizer at the input to the error latch, referred to herein as Error Latch Multiplexing (EMUX). Where the data stream is split into odd and even paths for alternating processing, the EMUX(xyx) position is flipped between the even and odd decision feedback equalizer summer at a pre-determined rate as programmed. The error latch position 0 516 corresponds to the expected level with the data bits in interval UL(n−1) and interval UL(n) each being 0: Error latch position 0 516 {d(n−1), d(n)}=(0,0). In other words, error latch position 0 516 corresponds to the expected voltage level for two sequential bits of value 0 in intervals UL(n−1) and UL(n). Similarly, error latch position 0 516, position 1 520, position 2 518 and position 3 522 correspond to bit sequences in interval UL(n−1) and interval UL(n) as follows: Error latch position 1 520 {d(n−1), d(n)}={0,1}, error latch position 2 518 {d(n−1), d(n)}={1,0}, Error latch position 3 522 {d(n−1), d(n)}={1,1}. The EMUX in the decision feedback equalizer is configured to alternately multiplex the appropriate voltage levels to the error latch to set the error latch at the four possible locations.

For example, for dlev110 (e.g., 104, 204) and dlev110 (e.g., 112, 212) adaptation, the EMUX is alternated between setting 2 and setting 3, alternating the error latch between position 2 518 and position 3 522. Gradients dlev110Grad(n) and dlev101Grad(n) used to adapt dlev110 (e.g., 104, 204) and dlev101 (e.g., 112, 212) are calculated based on the outputs of the exyz error latch as follows:

$$dlev110Grad(n) = e110(n)*d(n)*EMUX(3)$$

$$dlev101Grad(n) = -e101(n)*d(n)*EMUX(2) \qquad (Eq\ 3)$$

where EMUX(3) and EMUX(2) represent EMUX setting of 3 and 2 corresponding to data history, {d(n−1), d(n), d(n+1)=110} and {d(n−1), d(n), d(n+1)=101}, and where exyz(n) is the error latch value. Notably, the error latch value for EMUX setting 2 is inverted to yield the absolute value.

In operation, for example, the gradients used to adapt the data levels dlev110 (e.g., 104, 204) and dlev101 (e.g., 112, 212) can be collected as follows. In the odd decision feedback equalizer path 504, the EMUX is configured to setting 3 (see eye diagram 510) to set the error latch to position 3 522 for the center bit in data pattern '110' and the corresponding gradient dlev110Grad(n) is updated based on the error latch output according to Equation 3. In the even decision feedback equalizer path 506, the EMUX is configured to setting 2 (see eye diagram 512) to set the error latch to position 2 518 for the center bit in data pattern '101' and the corresponding gradient dlev101Grad(n) is updated based on the error latch output according to Equation 3. The EMUX settings are then rotated. In the odd decision feedback equalizer path 504, the EMUX is configured to setting 2 (see eye diagram 526) to set the error latch to position 2 518 for the center bit in data pattern '101' and the corresponding gradient dlev101Grad(n) is updated based on the error latch output according to Equation 3. In the even decision feedback equalizer path 506, the EMUX is configured to setting 3 (see eye diagram 528) to set the error latch to position 3 522 for the center bit in data pattern '110' and the corresponding gradient dlev110Grad(n) is updated based on the error latch output according to Equation 3. Such rotation of EMUX settings can help to average out eye mismatches and static pattern sensitivities that can arise using a single error latch to adapt one data level per eye.

In another example, for dlev001 (e.g., 110, 210) and dlev010 (e.g., 102, 202) adaptation, the EMUX is alternated between setting 0 and setting 1, alternating the error latch between position 0 516 and position 1 520. Gradients dlev001Grad(n) and dlev010Grad(n) used to adapt dlev001 (e.g., 110, 210) and dlev010 (e.g., 102, 202) are calculated based on the outputs of the exyz error latch as follows:

$$dlev001Grad(n)=-e001(n)*d(n)*EMUX(0)$$

$$dlev010Grad(n)=e010(n)*d(n)*EMUX(1) \quad \text{(Eq 4)}$$

where EMUX(0) and EMUX(1) represent EMUX setting of 0 and 1 corresponding to data history, {d(n−1), d(n), d(n+1)=001} and {d(n−1), d(n), d(n+1)=010}, and where exyz(n) is the error latch value. Notably, the error latch value for EMUX setting 0 is inverted to yield the absolute value.

In operation, for example, the gradients used to adapt the data levels dlev001 (e.g., 110, 210) and dlev010 (e.g., 102, 202) can be collected as follows. In the odd decision feedback equalizer path 504, the EMUX is configured to setting 0 (see eye diagram 510) to set the error latch to position 0 516 for the center bit in data pattern '001' and the corresponding gradient dlev001Grad(n) is updated based on the error latch output according to Equation 4. In the even decision feedback equalizer path 506, the EMUX is configured to setting 1 (see eye diagram 512) to set the error latch to position 1 520 for the center bit in data pattern '010' and the corresponding gradient dlev010Grad(n) is updated based on the error latch output according to Equation 4. The EMUX settings are then rotated. In the odd decision feedback equalizer path 504, the EMUX is configured to setting 1 (see eye diagram 526) to set the error latch to position 1 520 for the center bit in data pattern '010' and the corresponding gradient dlev010Grad(n) is updated based on the error latch output according to Equation 4. In the even decision feedback equalizer path 506, the EMUX is configured to setting 0 (see eye diagram 510) to set the error latch to position 0 516 for the center bit in data pattern '001' and the corresponding gradient dlev001Grad(n) is updated based on the error latch output according to Equation 4.

Figure 6:
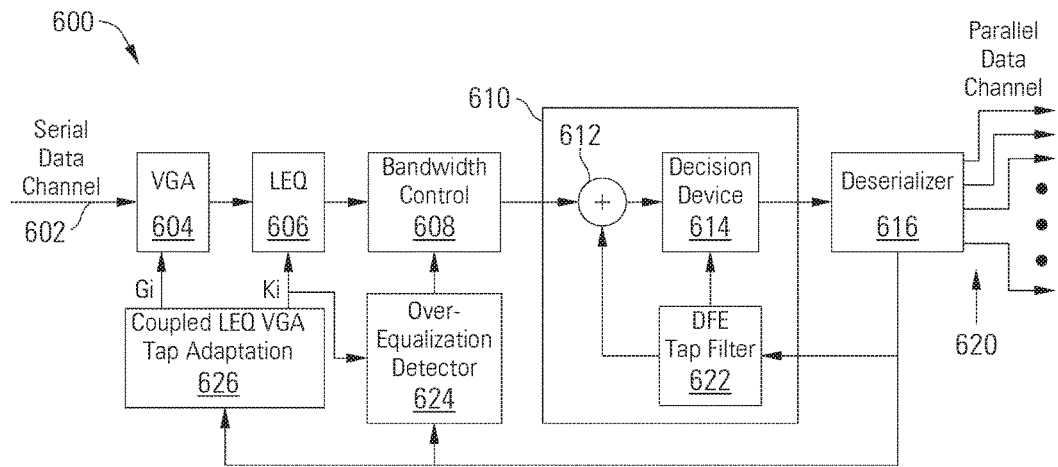
FIG. 6 is a block diagram of a serializer/deserializer receiver with bandwidth adaptation including qualifying inner and outer eye adaptation levels in accordance with some embodiments of the present invention.

Turning to FIG. 6, a block diagram of a serializer/deserializer receiver 600 with bandwidth adaptation by qualifying inner and outer eye adaptation levels is depicted in accordance with some embodiments of the present invention. The serializer/deserializer receiver 600 receives an incoming serial signal from serial data channel 602, and performs signal enhancements before sampling the serial signal. Such enhancements include amplifying the incoming serial data from channel 602 in variable gain amplifier (VGA) 604, and filtering the signal frequency range in continuous time linear equalizer (LEQ) 606 to compensate for frequency dependent degradation of the serial signal from channel 602 in channel media. The variable gain amplifier 604 and linear equalizer 606 are generally implemented in analog electronic circuitry, although not limited to this implementation.

The variable gain amplifier 604 and linear equalizer 606 have variable coefficients or parameters that can be controlled to adjust the gain and boost, respectively, applied to the serial signal from channel 602. The gain and boost are adapted to compensate (to the best of its ability depending on implementation) for frequency dependent distortions in channel 602. The variable gain amplifier 604 applies gain to the serial signal from channel 602 and linear equalizer 606 applies linear equalization to the gain adjusted serial signal. The effect of linear equalizer 606 may be a form of high pass filtering. In some cases, the variable gain amplifier 604 and linear equalizer 606 are coupled, with the gain in variable gain amplifier 604 and the boost in linear equalizer 606 being jointly adapted, for example based on a weighted least mean square gradient and a group delay gradient to achieve desired gain and boost settings for a target channel.

A receiver bandwidth control circuit 608 corrects for over-equalization, for example by connecting a load to the output of the linear equalizer 606, effectively low pass filtering the output of the linear equalizer 606 and reducing the high frequency energy of the signal. For example, in some embodiments the receiver bandwidth control circuit 608 comprises a capacitor connected between the output of the linear equalizer 606 and a ground or other voltage reference, depending on the type of data protocol implemented in the receiver 600. The value of the load applied by the receiver bandwidth control circuit 608 can be fixed or variable, with values selected to lower the corner frequency of the low pass filtering applied to the signal. Other types of low pass filtering, boost reduction, etc. can be used in receiver bandwidth control circuit 608 to compensate for over-equalization based upon inner eye and outer eye magnitudes. Based upon the disclosure herein, one of skill of the art will recognize a number of bandwidth adaptation circuits that can be used to compensate for over-equalization in the receiver 600 in accordance with various embodiments of the invention.

Because equalization in linear equalizer 606 does not necessarily compensate to a full extent for frequency dependent distortions of channel 602, additional equalization can be applied when needed to the serial signal in decision feedback equalizer (DFE) 610. The decision feedback equalizer 610 also samples the gain adjusted and equalized signal. The decision feedback equalizer 610 includes decision device (e.g., slicer) 614, for example comprising two data latches, that generates output decisions d(t) in the digital discrete timing domain corresponding to the input signal y(t). The decision feedback equalizer 610 also includes decision feedback equalizer tap filter 622 and combiner 612 that applies equalization to the signal from the linear equalizer 606 prior to slicing in a manner well known to one skilled in the art. The tap filter 622 uses feedback of detected and/or decisions for detected symbols, filtered according to filter taps that can be adapted based on estimates of time-shifted pulse energy distortion contributions to a current, received symbol. Adaptation algorithms for filter taps for decision feedback equalizer tap filter 622 are well known to one skilled in the art.

The data samples produced by the decision device 614 in the decision feedback equalizer 610 are provided to a deserializer 616, which routes the detected data bits onto the parallel data bus 620. The data signal from deserializer 616 can also be provided to the decision feedback equalizer tap filter 622 to adapt the filter taps, as well as to an over-equalization detector 624.

The detection of inner eye levels and outer eye levels can be performed using any suitable circuit. Based upon the disclosure herein, one of skill of the art will recognize a number of eye level detectors that can be used to compensate for over-equalization in the receiver 600 in accordance with various embodiments of the invention.

In some embodiments, the over-equalization detector 624 detects over-equalization by comparing the magnitudes of the inner eye and outer eye. The decision feedback equalizer 610 and deserializer 616 are used to determine whether the current series of data bits correspond to an inner eye or an outer eye. Data bit series with '010' or '101' are inner eyes, and data bit series with '110' or '001' are outer eyes. Notably, although this example embodiment uses three-bit series to distinguish between inner and outer eyes, other data bit series lengths can be used to distinguish between inner and outer eyes in other embodiments, for example if the signal is oversampled. As shown in FIG. 2B, the inner eye in the eye diagram should be defined by the peak formed in the '010' bit pattern or by the valley formed in the '101' bit pattern, and the outer eye in the eye diagram should be defined by other bit patterns, including for example a '110' or a '001' bit pattern. However, as shown in FIG. 1B, when the signal is over-equalized, the inner eye can have a greater magnitude than the outer eye. Thus, the term "inner eye" is used herein to refer to particular bit patterns, i.e., the '010' and '101' patterns, and the term "outer eye" is used herein to refer to other particular bit patterns, even when the magnitude of the inner eye is greater than the outer eye. Again, the output of the deserializer 616 is used to determine whether the current bit series corresponds to an inner eye or an outer eye.

An error latch in the decision feedback equalizer 610 is used in some embodiments to identify the magnitudes of the signal forming the inner eye and outer eye. Although in this example embodiment, the over-equalization is detected in the output of the linear equalizer 606, enabling the linear equalizer 606 to reduce the boost as much as possible before examining the signal for over-equalization prior to digitization, in other embodiments over-equalization can be detected in the signal at any suitable location.

The error latch in the decision feedback equalizer 610 captures the value of the signal based on an adjustable threshold level as disclosed above. In some embodiments, a single error latch is included in the decision feedback equalizer 610 with an error multiplexer in the decision feedback equalizer 610 used to set the threshold level for the error latch. The error multiplexer can be set, for example, to provide one of four different inputs to the error latch, each corresponding to a different threshold level, so that the error latch will contain either a '0' or a '1' based on whether the signal amplitude is above or below that threshold level.

In this example embodiment, the latch output is in the digital domain, either 0 or 1 based on the magnitude of the analog data signal compared to the threshold applied by the error multiplexer to the error latch. In other example embodiments, the latch output can be in the analog domain, with the latch storing the voltage level and with the over-equalization detector 624 directly comparing the stored voltage values for the inner eye data pattern with those for the outer eye data pattern. The error latch output can be provided to the over-equalization detector 624 directly from the decision feedback equalizer 610 or via the deserializer 616. Based upon the disclosure herein, one of skill of the art will recognize a number of eye level detectors and detection points that can be used to compensate for over-equalization in the receiver 600 in accordance with various embodiments of the invention.

In some embodiments, the over-equalization detector 624 comprises a data pattern detector to determine whether the current bit sequence at the output of the deserializer 616 corresponds to an inner eye or an outer eye. In some other embodiments, the deserializer 616 includes a data pattern detector that directly informs the over-equalization detector 624 as to whether the current bit sequence corresponds to an inner eye or an outer eye.

In some embodiments, the over-equalization detector 624 comprises a comparator that compares the magnitude of the absolute value of the inner eye dlev with the magnitude of the absolute value of the outer eye dlev, according to Equation 5:

$$\text{Over equalization} = abs(\text{dlev}110) > abs(\text{dlev}101)?\text{No:}$$
$$\text{Yes}$$

$$\text{Over equalization} = abs(\text{dlev}001) > abs(\text{dlev}010)?\text{No:}$$
$$\text{Yes} \qquad (\text{Eq 5})$$

In a test for the top of the eye diagram using the first portion of Equation 5, when the absolute value of the signal magnitude near the center sample index of bit pattern '110' (an outer eye) is not greater than the absolute value of the signal magnitude near the center sample index of bit pattern '101' (an inner eye), the signal is identified as being over-equalized. Otherwise, when the absolute value of the signal magnitude near the center sample index of bit pattern '110' (an outer eye) is greater than the absolute value of the signal magnitude near the center sample index of bit pattern '101' (an inner eye), the signal is identified as not being over-equalized.

In a similar test for the bottom of the eye diagram using the second portion of Equation 5, when the absolute value of the signal magnitude near the center sample index of bit pattern '001' (an outer eye) is not greater than the absolute value of the signal magnitude near the center sample index of bit pattern '010' (an inner eye), the signal is identified as being over-equalized. Otherwise, when the absolute value of the signal magnitude near the center sample index of bit pattern '001' (an outer eye) is greater than the absolute value of the signal magnitude near the center sample index of bit pattern '010' (an inner eye), the signal is identified as not being over-equalized.

In some embodiments with a coupled variable gain amplifier 604 and linear equalizer 606, a tap adaptation circuit 626 adapts the gain index Gi controlling the gain applied by the variable gain amplifier 604 and the boost index Ki controlling the boost applied by the linear equalizer 106, for example based on the least mean square gradient and the group delay gradient. In such embodiments, the over-equalization detector 624 also receives the Ki boost index value from the linear equalizer 606, and waits until the boost index applied to the signal by the linear equalizer 606 is at the minimum value before applying the load in the bandwidth control circuit 608. The tap adaptation circuit 626 will tend to reduce the boost applied by the linear equalizer 606 when the signal is over-equalized. By waiting until the linear equalizer 606 has reduced the boost as much as possible before adapting the receiver bandwidth, the linear equalizer 606 is allowed to be fully adapted before connecting the load in the bandwidth control circuit 608. In these embodiments, the over-equalization detector 624 tests the boost index value from the linear equalizer 606 as well as testing for over detection before controlling the bandwidth control circuit 608 to reduce the bandwidth of the receiver 600.

Figure 7:
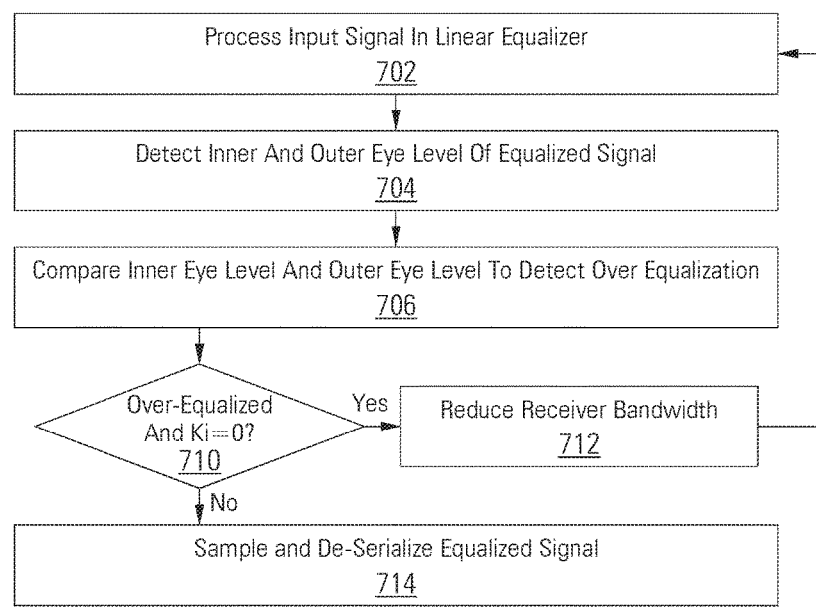
FIG. 7 is a flow diagram of an operation to adapt serializer/deserializer receiver bandwidth based on inner and outer eye adaptation levels in accordance with some embodiments of the present invention.

Turning to FIG. 7, flow diagram 700 depicts an operation to adapt serializer/deserializer receiver bandwidth based on inner and outer eye adaptation levels in accordance with some embodiments of the present invention. Following flow diagram 700, an input signal is processed in a linear equalizer. (Block 702) In some embodiments, the input signal comprises an analog signal representing a serial data stream, for example read from a storage device such as a hard disk drive or a flash memory device, or received from a transmitter in a wireless communication system. In some embodiments, the linear equalizer comprises a continuous linear equalizer that applies a frequency-dependent boost to the signal to compensate for channel loss. The inner eye level and the outer eye level are detected for the signal. (Block 704) In some embodiments, the inner and outer eye levels are detected for the equalized signal from the linear equalizer. The inner and outer eye levels can be detected in any suitable manner, such as, but not limited to, using a pattern detector to detect bit patterns corresponding to inner and outer eyes at the output of a deserializer, using one or more error latches to measure the magnitude of the equalized signal, and using comparators to compare the absolute value of the magnitude of the equalized signal for inner and outer eyes in the signal. The inner eye level is thus compared with the outer eye level to detect over-equalization. (Block 706) A determination is made as to whether the signal is over-equalized and the boost applied by the linear equalizer is at its minimum value. (Block 710) If the signal is over-equalized and the boost is at its minimum value, the receiver bandwidth is reduced. (Block 712) Thus, in some cases, adaptation of the linear equalizer is first performed until the boost index applied by the linear equalizer is at its minimum value, before reducing the receiver bandwidth. In some embodiments, the receiver bandwidth is reduced by applying or connecting a load to the linear equalizer output. In other embodiments, the bandwidth can be reduced in any suitable manner and at any suitable point in the receiver. When the bandwidth has been reduced (Block 712) for the over-equalized signal, the process continues at Block 702, again testing for over-equalization after the receiver bandwidth has been reduced. This allows the system to settle and the effect of the bandwidth reduction to be tested to determine whether the over-equalization has been removed.

When the signal is not over-equalized (Block 710), the equalized signal is sampled and de-serialized. (Block 714) The testing for over-equalization and application of the load can be performed either continuously or periodically.

The receiver bandwidth adaptation disclosed here allows a serializer/deserializer receiver to compensate for an over-equalized signal, while allowing a linear equalizer in the receiver to operate normally. In some embodiments, the amount of bandwidth reduction is based on the particular data pattern. In such cases, the load connected to the linear equalizer output can be varied based on the data pattern, for example by selectively connecting elements of a capacitor bank between the linear equalizer output and a ground.

Serializer/deserializer technology, and in particular the coupled linear equalizer/variable gain amplifier coefficient adaptation disclosed herein, is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

In conclusion, embodiments of the present invention provide novel systems, devices, methods and arrangements for bandwidth adaptation in a serializer/deserializer (SerDes) receiver based on inner and outer eye levels. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for processing data, comprising:
a linear equalizer;
a load switchably connected to an output of the linear equalizer;
a slicer that samples a signal derived from the output of the linear equalizer; and
a detector circuit that detects an over-equalization condition in data to be sampled by the slicer and to connect the load to the output of the linear equalizer in the over-equalization condition.

2. The apparatus of claim 1, wherein the detector circuit is connects the load to the output of the linear equalizer in the over-equalization condition only when a boost setting in the linear equalizer is at a minimum level.

3. The apparatus of claim 1, wherein the linear equalizer comprises a continuous time linear equalizer.

4. The apparatus of claim 1, wherein the detector circuit detects the over-equalization condition in an input to the linear equalizer.

5. The apparatus of claim 1, wherein the detector circuit detects the over-equalization condition in the output of the linear equalizer.

6. The apparatus of claim 1, wherein the over-equalization condition comprises an inner eye height of the data to be deserialized being greater than an outer eye height of the input to the linear equalizer.

7. The apparatus of claim 1, wherein the detector circuit comprises a data latch and an error latch that sample the data at an inner eye level and an outer eye level.

8. The apparatus of claim 1, wherein the detector circuit comprises a comparator that compares absolute values of eye levels.

9. The apparatus of claim 8, wherein the comparator indicates the over-equalization condition when the absolute value of the eye level magnitude for a data pattern '110' is less than the absolute value of the eye level magnitude for a data pattern '101'.

10. The apparatus of claim 8, wherein the comparator indicates the over-equalization condition when the absolute value of the eye level magnitude or a data pattern '001' is less than the absolute value of the eye level magnitude for a data pattern '010'.

11. The apparatus of claim 1, further comprising a decision circuit that samples an analog signal from the output of the linear equalizer to yield digital data samples as the data to be deserialized.

12. A method for deserializing data, comprising:
equalizing an analog signal in a continuous time linear equalizer in a deserializer receiver;
determining whether the analog signal is over-equalized;
reducing a bandwidth of the deserializer receiver when the analog signal is over-equalized by connecting a load to an output of the continuous time linear equalizer;
converting the analog signal to digital data; and
deserializing the digital data.

13. The method of claim 12, wherein the bandwidth of the deserializer receiver is only reduced when the analog signal is over-equalized and when a boost applied by the continuous time linear equalizer is at a minimum value.

14. The method of claim 12, wherein determining whether the analog signal is over-equalized comprises setting a latch level at an inner eye level and at an outer eye level and sampling the analog signal at the latch levels.

15. The method of claim 14, wherein determining whether the analog signal is over-equalized further comprises comparing an absolute value of the sampled analog signal at the inner eye level with an absolute value of the sampled analog signal at the outer eye level, wherein the analog signal is over-equalized when the absolute value of the sampled analog signal at the inner eye level is greater than the absolute value of the sampled analog signal at the outer eye level.

16. The method of claim 14, wherein the analog signal is sampled with the latch level at the inner eye level for a data pattern of '110' and the analog signal is sampled with the latch level at the outer eye level for a data pattern of '101'.

17. The method of claim 14, wherein the analog signal is sampled with the latch level at the inner eye level for a data pattern of '001' and the analog signal is sampled with the latch level at the outer eye level for a data pattern of '010'.

18. A deserializer receiver comprising:
linear equalizer means for filtering the amplified signal to yield an equalized signal;
means for detecting an inner eye level and an outer eye level in the equalized signal;
means for detecting when the equalized signal is over-equalized; and
means for reducing a bandwidth of the deserializer receiver when the equalized signal is over-equalized by, wherein the detecting when the equalized signal is over-equalized comprises setting a latch level at the inner eye level and at the outer eye level and sampling the equalized signal at the latch levels.

19. The deserializer receiver of claim 18, wherein the means for reducing a bandwidth of the deserializer receiver when the equalized signal is over-equalized is configured to reduce the bandwidth only when a boost applied by the linear equalizer is adapted to a minimum value.

20. The deserializer receiver of claim 18, wherein the over-equalization detector comprises a comparator configured to compare absolute values of the inner eye level and the outer eye level.

* * * * *